(12) United States Patent
Shi et al.

(10) Patent No.: US 9,977,187 B2
(45) Date of Patent: May 22, 2018

(54) POLARIZATION ROTATOR-SPLITTER/COMBINER BASED ON SILICON RIB-TYPE WAVEGUIDES

(71) Applicant: SiFotonics Technologies Co., Ltd., Woburn, MA (US)

(72) Inventors: Tuo Shi, Beijing (CN); Changhua Chen, Beijing (CN); Yongbo Shao, Beijing (CN); Dong Pan, Andover, MA (US)

(73) Assignee: SIFOTONICS TECHNOLOGIES CO., LTD., Woburn, MA (US)

( * ) Notice: Subject to any disclaimer, the term of this patent is extended or adjusted under 35 U.S.C. 154(b) by 70 days.

(21) Appl. No.: 14/715,429

(22) Filed: May 18, 2015

(65) Prior Publication Data

US 2015/0338577 A1 Nov. 26, 2015

Related U.S. Application Data

(60) Provisional application No. 61/997,140, filed on May 22, 2014.

(51) Int. Cl.
*G02B 6/00* (2006.01)
*G02B 6/126* (2006.01)
(Continued)

(52) U.S. Cl.
CPC ............ *G02B 6/126* (2013.01); *G02B 6/125* (2013.01); *G02B 6/14* (2013.01); *G02B 6/1228* (2013.01); *G02B 6/2773* (2013.01); *G02B 2006/121* (2013.01); *G02B 2006/1215* (2013.01); *G02B 2006/12061* (2013.01); *G02B 2006/12097* (2013.01); *G02B 2006/12116* (2013.01); *G02B 2006/12147* (2013.01); *G02B 2006/12176* (2013.01); *G02B 2006/12195* (2013.01)

(58) Field of Classification Search
CPC .......... G02B 6/126; G02B 6/125; G02B 6/14; G02B 6/122; G02B 6/12004; G02B 6/1228; G02B 6/2773; G02B 6/12061; G02B 6/12097; G02B 6/121; G02B 6/12116; G02B 6/12147; G02B 6/1215; G02B 6/12176; G02B 6/12195
USPC .......................................................... 385/11
See application file for complete search history.

(56) References Cited

U.S. PATENT DOCUMENTS

| | | | |
|---|---|---|---|
| 7,373,042 B2 * | 5/2008 | Little | G02B 6/126 385/11 |
| 7,499,610 B2 * | 3/2009 | Little | G02B 6/126 385/11 |

(Continued)

OTHER PUBLICATIONS

Silicon-on-insulator polarization splitting and rotating device for polarization diversity circuits by Liu et al.*

(Continued)

*Primary Examiner* — Ryan Lepisto
*Assistant Examiner* — Guy Anderson
(74) *Attorney, Agent, or Firm* — Han IP Corporation (57) ABSTRACT

Various embodiments of an integrated polarization rotator-splitter/combiner apparatus are described. An integrated polarization rotator-splitter apparatus may include an input waveguide section, a polarization rotator section, a polarization splitter section and an outgoing waveguide section, which can also be reversely connected as a polarization rotator-combiner.

37 Claims, 8 Drawing Sheets

(51) Int. Cl.
   *G02B 6/14*     (2006.01)
   *G02B 6/125*    (2006.01)
   G02B 6/122      (2006.01)
   G02B 6/12       (2006.01)
   G02B 6/27       (2006.01)

(56) References Cited

U.S. PATENT DOCUMENTS

| | | | | |
|---|---|---|---|---|
| 7,702,188 | B2* | 4/2010 | Little | G02B 6/1228 |
| | | | | 385/28 |
| 8,189,972 | B2* | 5/2012 | Little | G02B 6/12007 |
| | | | | 385/15 |
| 8,238,697 | B2* | 8/2012 | Little | G02B 6/1228 |
| | | | | 385/28 |
| 8,855,449 | B1* | 10/2014 | Roth | G02B 6/2773 |
| | | | | 385/11 |
| 8,873,899 | B2* | 10/2014 | Anderson | G02B 6/27 |
| | | | | 385/11 |
| 8,923,665 | B2* | 12/2014 | Barwicz | G02B 6/126 |
| | | | | 385/14 |
| 8,948,549 | B2* | 2/2015 | Picard | G02B 6/1228 |
| | | | | 385/11 |
| 9,122,006 | B1* | 9/2015 | Roth | G02B 6/126 |
| 9,817,186 | B2* | 11/2017 | Kamei | G02B 6/126 |
| 2014/0133796 | A1* | 5/2014 | Dong | G02B 6/126 |
| | | | | 385/11 |

OTHER PUBLICATIONS

Mode conversion in tapered submicron silicon ridge optical waveguides by Dai et al.*

* cited by examiner

POLARIZATION ROTATOR-SPLITTER/COMBINER BASED ON SILICON RIB-TYPE WAVEGUIDES

CROSS-REFERENCE TO RELATED PATENT APPLICATION(S)

The present disclosure is a non-provisional application of, and claims the priority benefit of, U.S. Patent Application No. 61/997,140, filed on May 22, 2014, which is herein incorporated by reference in its entirety.

TECHNICAL FIELD

The present disclosure is related to optoelectronic devices. More particularly, the present disclosure is related to polarization rotator-splitter/combiner based on silicon rib-type waveguides.

BACKGROUND

In recent years, the combination of digital signal process (DSP), coherent detection, and spectral efficient high-level modulation format has been favored to increase network capacity. Recent developments in high speed electronic DSP technology have enabled compensation for fiber optic impairment electronically. The long-haul network has begun to utilize 100G coherent transmission systems, and metro network will follow the steps of long-haul network at a time delay of two to three years, as it did in the past decades. However, metro 100G coherent transmission network is much more sensitive to the footprint, power consumption and cost of the coherent transceiver modules. Silicon photonics technology is the key to tackle cost and footprint. With optical integration on silicon-on-insulator (SOI) platform, cost may be reduced by minimizing assembly touch points, mechanical adjustments, test apparatuses and the requirement of materials and separated devices.

SUMMARY

This invention provides an integrated rib-waveguide based polarization rotator-splitter/combiner, for completely splitting an input TE0 mode and an input TM0 mode into two separate waveguides with TE0 mode, or completely combining two input waveguides with TE0 mode into one output waveguide with TE0 and TM0 signals, with large fabrication tolerance.

The integrated polarization rotator-splitter comprises an input waveguide section, from which a TE0-polarized signal and a TM0-polarized signal is input, a rib-waveguide based polarization rotation section, which converts the TM0-polarized component into a TEn-mode of the waveguide, while TE0-signal remains unchanged, a polarization splitter section, comprising a rib-waveguide based directional coupler which couples TEn-mode to a parallel waveguide while TE0 mode remains unchanged, and an outgoing waveguide section separates the two signals. The polarization rotation section and polarization splitter section have a predetermined length, respectively, to achieve best performance. The polarization rotator-splitter can also be connected vice versa so as to function as a polarization rotator-combiner.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

DETAILED DESCRIPTION OF THE PREFERRED EMBODIMENTS

Overview

In present mainstream scheme of 100G coherent transmission systems, QPSK modulation format with polarization division multiplexing (PDM-QPSK) is used to achieve 100G bit data rate with only 25G baud rate. Thus, polarization control elements need to be implemented to realize polarization division multiplexing.

One available scheme is to utilize a grating coupler to decouple input TM/TE modes into two TE modes propagating along orthogonally-oriented waveguides. An unavoidable drawback of such a grating coupler is wavelength sensitive, since the input wavelength should match the periodical condition. Besides, critical dimension error of CMOS process implemented for integrated photonics may be as high as 10~20 nm and etch depth error from dry etch process is typically around 10~15 nm, thus undesirably resulting in large fluctuation of coupling excess loss of the grating coupler at full C-band or L-band wavelength range.

Figure 8:
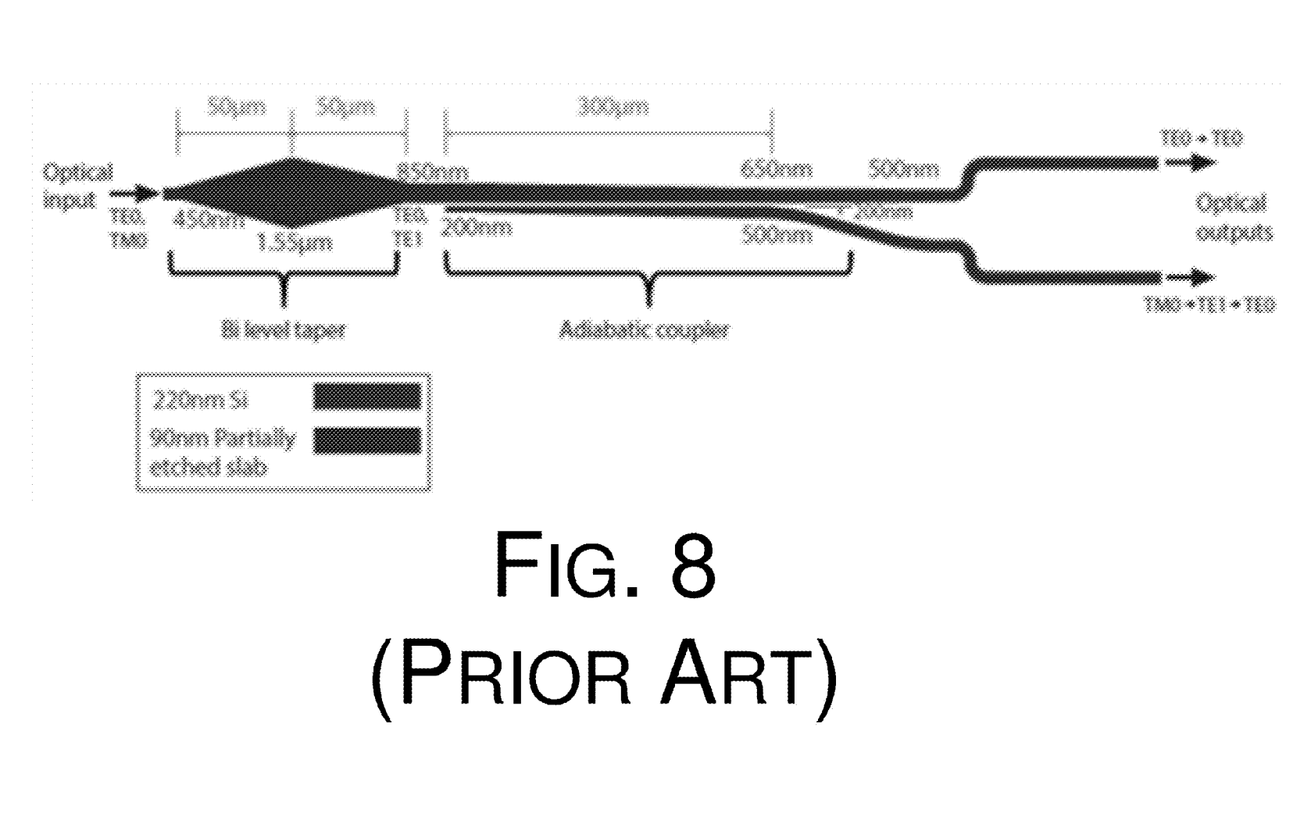
FIG. 8 shows conventional integrated slab-type polarization rotator and channel-type polarization splitter.

An alternative scheme is to utilize a polarization rotator and a polarization splitter for polarization division multiplexing. A first approach is to provide a wavelength-insensitive polarization rotator/splitter based on channel-type waveguides. The polarization rotator of which is based on an adiabatic taper channel-type waveguide with air or $Si_3N_4$ as cladding layer, while the polarization splitter is based on asymmetric directional coupler composed of two channel-type waveguides, which are sensitive to the waveguide width. A second approach is to provide an improved structure of polarization rotator/splitter with larger fabrication tolerance. The polarization rotator part utilizes rib-type waveguide instead of air or $Si_3N_4$ cladding layer to break the vertical symmetry, and the polarization splitter part utilizes asymmetric directional coupler based on channel-type taper waveguides. Since effective index of TE0 mode in the "narrow" channel waveguide is sensitive to the waveguide width, it requires a long taper to overcome the critical dimension error of fabrication process, and as a result, the footprint is not compact enough as illustrated in FIG. 8.

Figure 1:
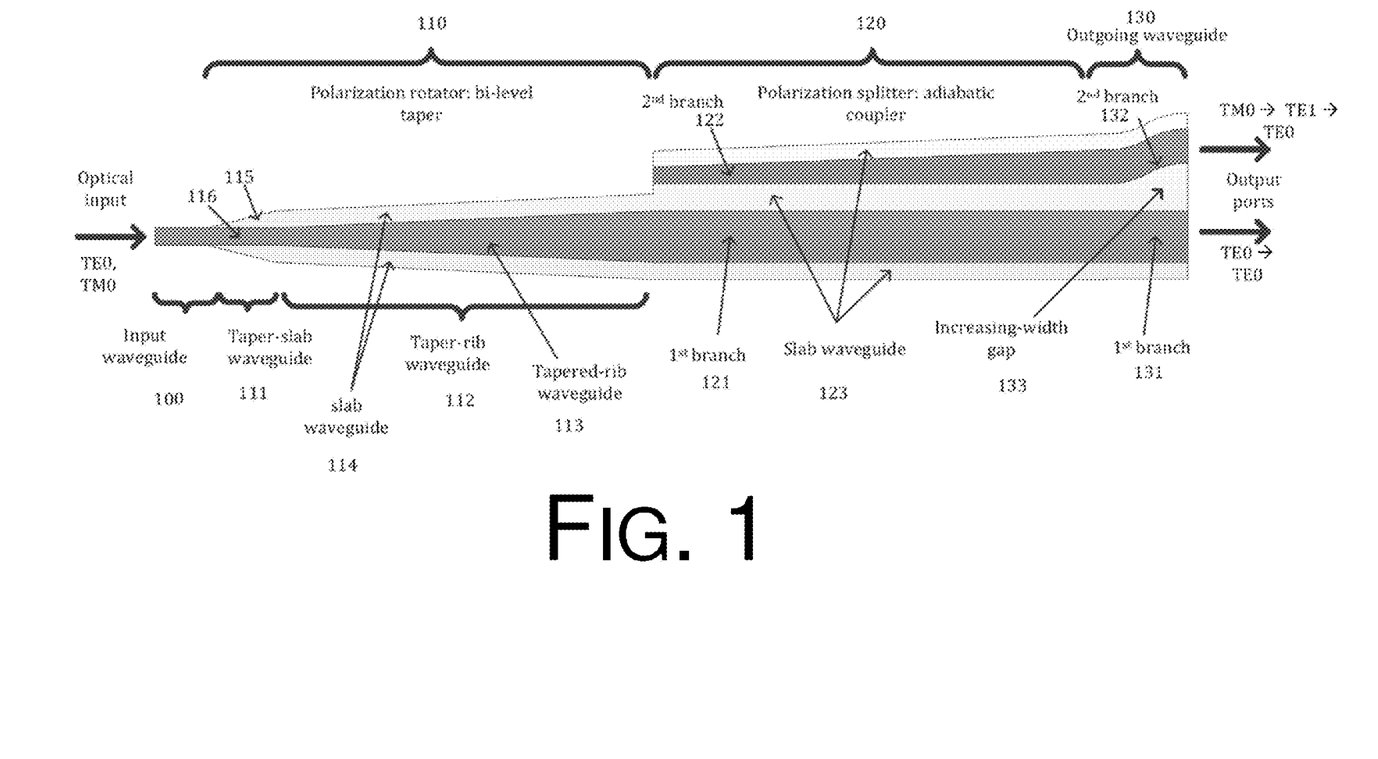
FIG. 1 shows a top view of a polarization rotator-splitter based on slab-type waveguides in accordance with an embodiment of the present disclosure.
Figure 2:
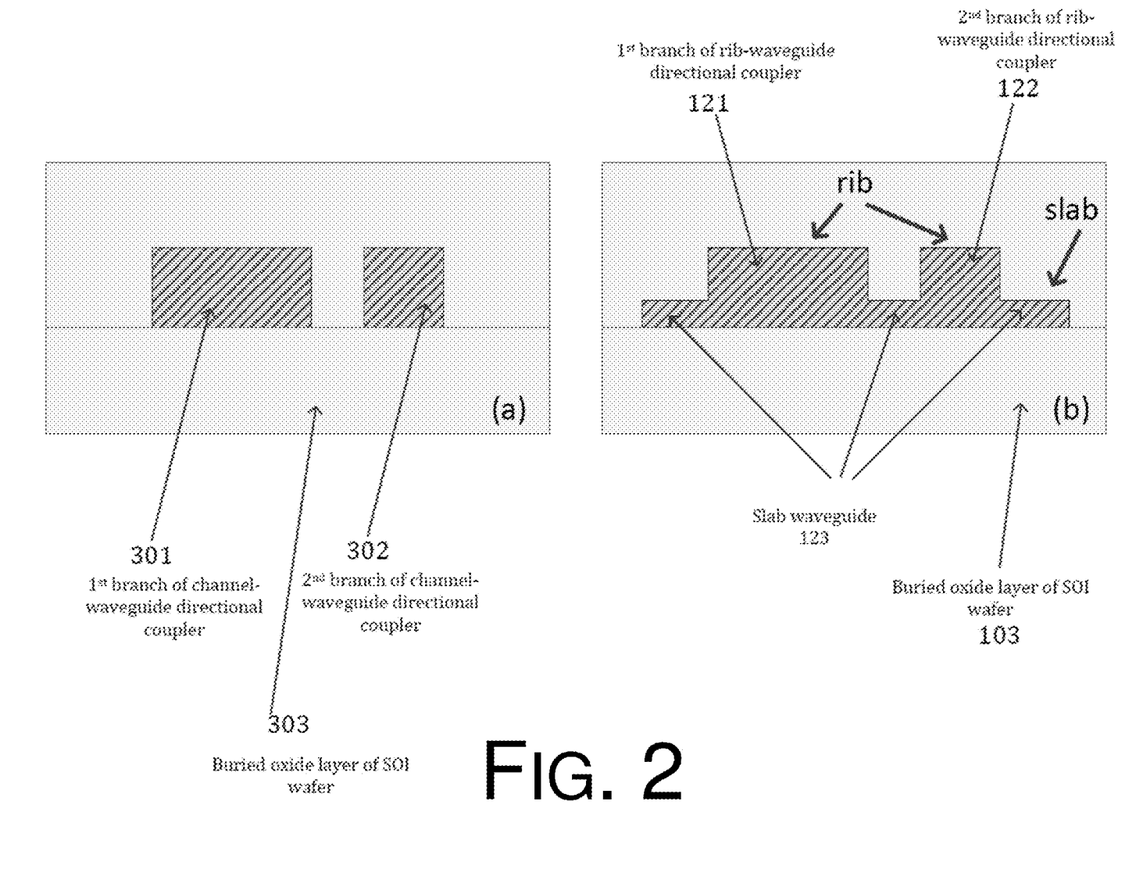
FIG. 2 shows a cross-sectional view of an asymmetric directional coupler of (a) channel-type and (b) rib-type in accordance with an embodiment of the present disclosure.

An embodiment of the present disclosure provides a compact-size, low-loss, wavelength-insensitive and fabrication-tolerant polarization rotator/splitter based on rib-type waveguides, as illustrated in FIG. 1. The length of polarization rotator part is about 10 um, and the length of the polarization splitter part is within 20 um, which makes the total length to be around 30 um, ensuring a much smaller footprint compared with the second approach described above. The difference of channel-type and rib-type asymmetric directional coupler is illustrated in FIG. 2.

Figure 3:
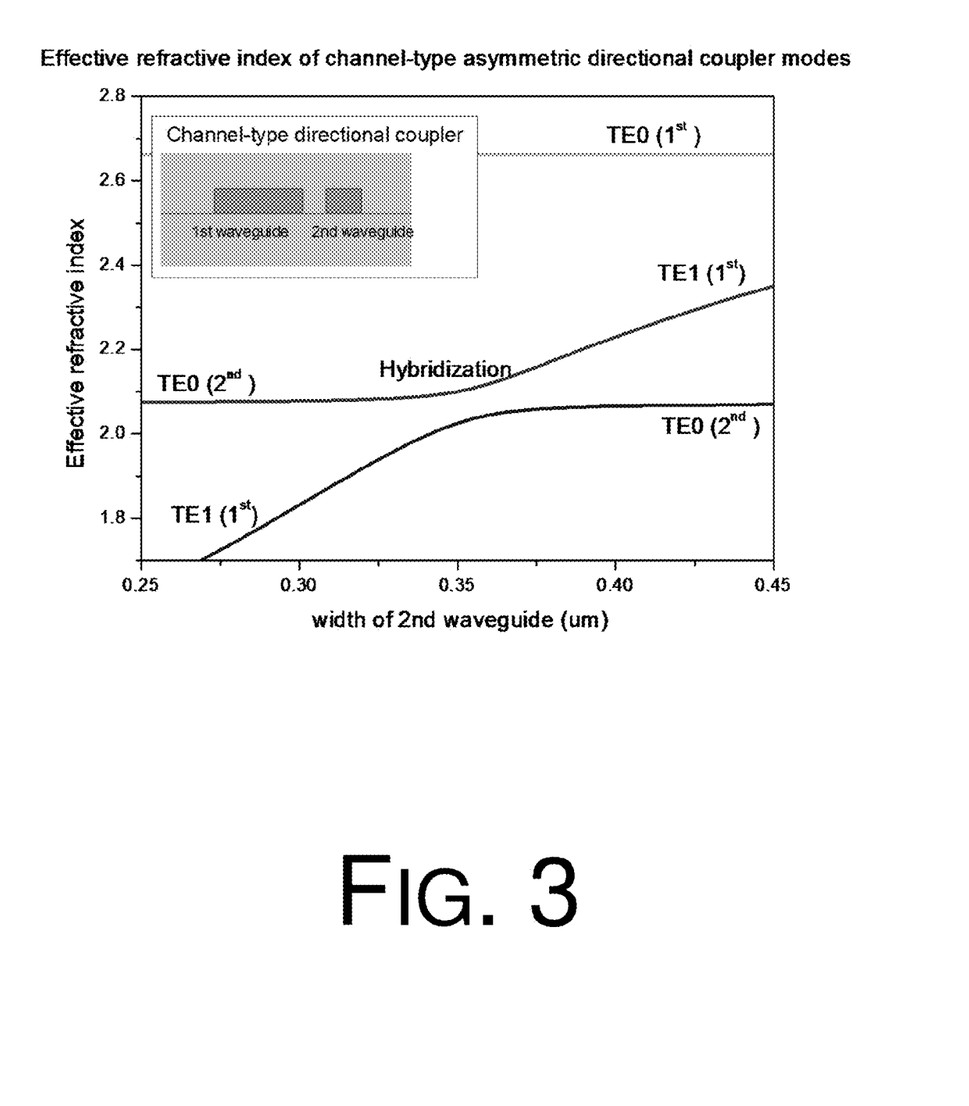
FIG. 3 shows an effective refractive index of Eigen modes in the channel-type asymmetric directional coupler to illustrate the mode hybridization of TE1 mode in a first waveguide and TE0 mode in a second waveguide in accordance with an embodiment of the present disclosure.
Figure 4:
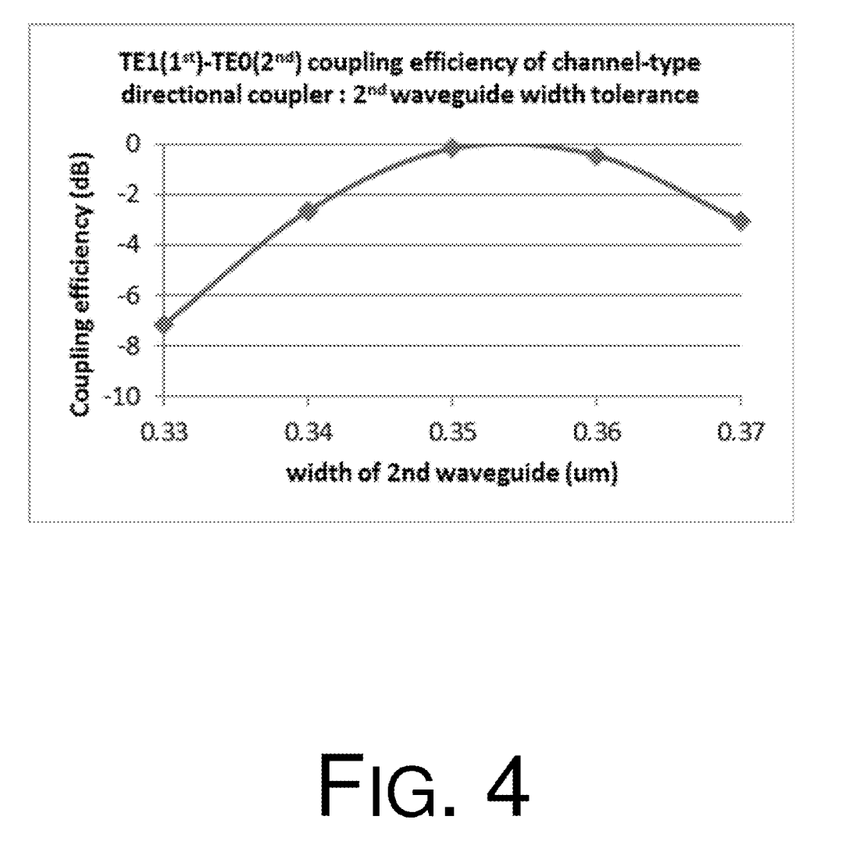
FIG. 4 shows a waveguide width tolerance analysis of channel-type directional coupler in accordance with an embodiment of the present disclosure.

FIG. 3 illustrates the effective refractive index of Eigen modes in the channel-type asymmetric directional coupler, which illustrates the mode hybridization of TE1 mode in a first waveguide and TE0 mode in a second waveguide. The cross of TE1 (the first waveguide) and TE0 (the second waveguide) index curves demonstrates the condition of mode hybridization. The effective refractive index of TE1 mode in the first waveguide increases rapidly with its width, which results in a small hybridization zone as width changes. Thus, channel-type directional coupler is sensitive to waveguide width, as shown in FIG. 4. When the width of the second waveguide slightly deviates from optimized value, the coupling efficiency from TE1 (the first waveguide) and TE0 (the second waveguide) drops rapidly.

Figure 5:
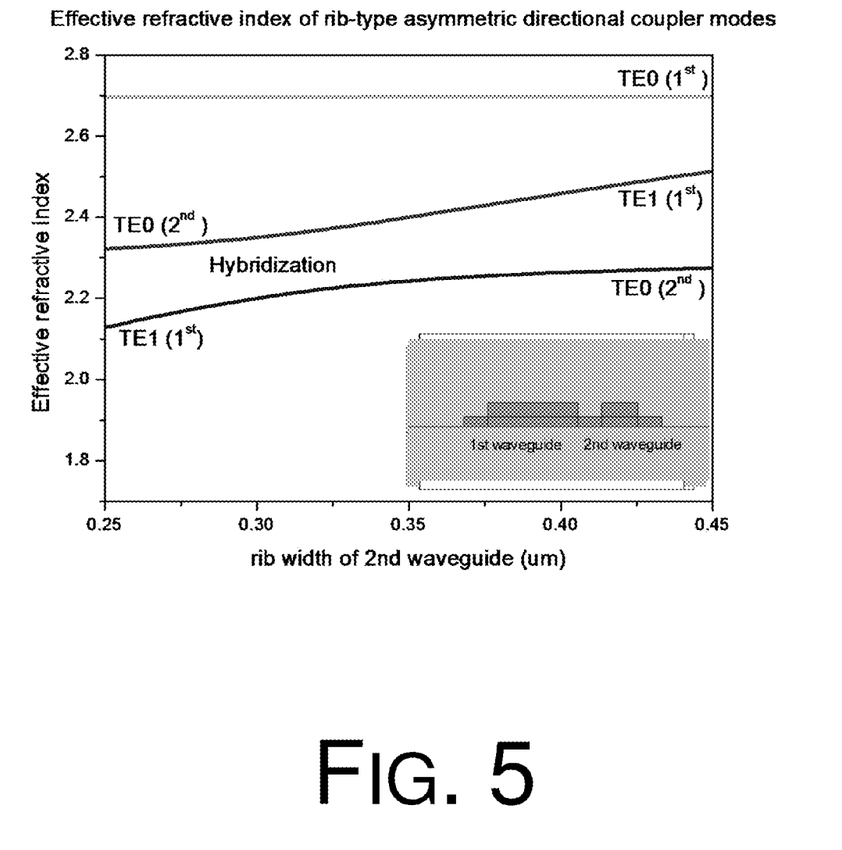
FIG. 5 shows a calculated effective refractive index of TE0, TM0 and TE1 modes in rib-type directional coupler at various rib widths of the second waveguide in accordance with an embodiment of the present disclosure.
Figure 6:
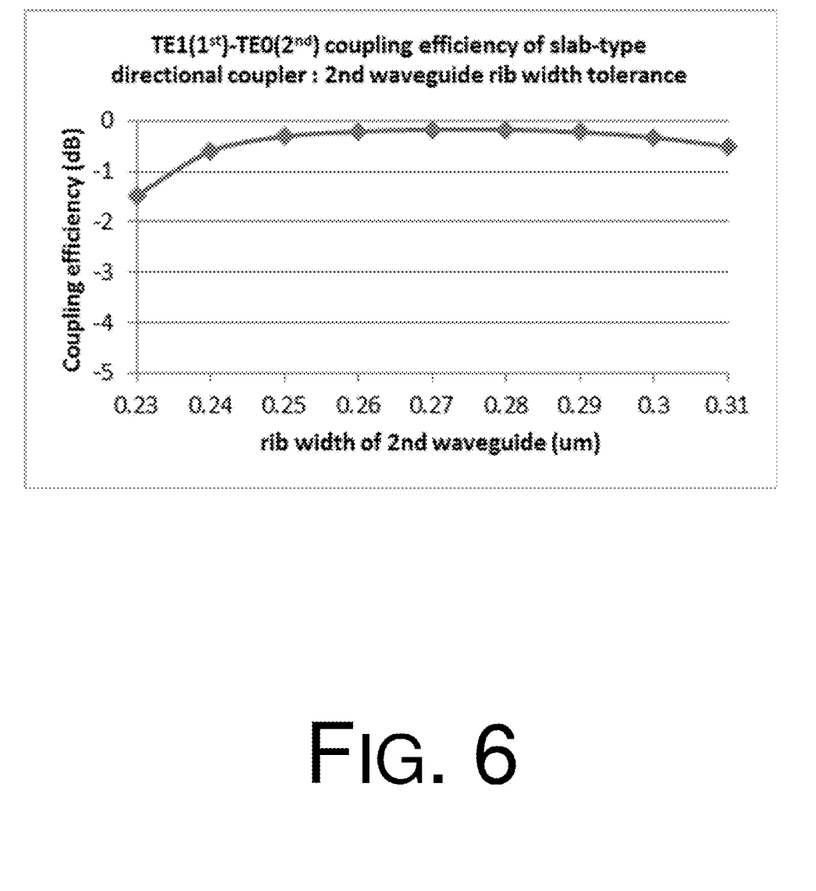
FIG. 6 shows a rib width tolerance analysis of slab-type directional coupler in accordance with an embodiment of the present disclosure.

The effective refractive index of Eigen modes in rib-type asymmetric directional coupler is plotted in FIG. 5. The effective refractive index of TE1 (the first waveguide) mode increases more slowly with rib width than that of channel-type asymmetric directional coupler. The calculated coupling efficiency from TE1 (the first waveguide) to TE0 (the second waveguide) of the rib-type asymmetric directional coupler is shown in FIG. 6, which shows that the rib width tolerance of the second waveguide is as large as +/−30 nm with merely 0.5 dB coupling efficiency drop. The tolerance of the rib-type waveguide width is much larger than that of channel-type asymmetric directional coupler, along with much smaller footprint.

Highlights of Select Features

In view of the above, features of the present disclosure are highlighted below.

In one aspect, an integrated polarization rotator/splitter apparatus may include an input waveguide section, a rib-type waveguide based polarization rotator section, a rib-type waveguide based polarization splitter section and an outgoing waveguide section.

In some embodiments, the input waveguide section may include a channel-type waveguide configured to receive an optical signal with TE0-polarized and TM0-polarized modes.

In some embodiments, the polarization rotator section may include a taper rib-type waveguide that includes a first part 111 and a second part 112. The first part may include a tapered slab 115 on each side of the rib-type waveguide 116. Each tapered slab may be configured to adiabatically couple an optical signal from channel modes to rib modes. The second part may include a tapered rib 113 with larger width on an output side. Each tapered rib may be configured to rotate a TM0-polarized component of the optical signal to a higher-order mode, TEn, of the rib-type waveguide and to output the TEn mode to the polarization splitter section, with n greater than or equal to 1. The TE0-polarized component may propagate without loss and is provided to the polarization splitter section 120.

In some embodiments, the polarization splitter section 120 may include a rib-type asymmetric directional coupler that includes a first branch 121 and a second branch 122. The first branch may be connected to an output port of the polarization rotator section 110. The first branch may be configured to propagate a TE0 component to the output port without loss. The second branch 122 may be disposed in parallel with the first branch 121. A rib width of the second branch 122 may be configured to match a TE0 mode thereof to a higher-order mode, TEn, in the first branch 121 such that a TEn component from the first branch 121 is coupled to the second branch 122.

In some embodiments, the outgoing waveguide section 130 may include two output waveguides 131,132 separated by increasing-width gap 133 that includes a first output waveguide, a second output waveguide and a gap. The first output waveguide 131 may include an input port connected to a first branch 121 of a rib-type asymmetric directional coupler 120. The second output waveguide 132 may include an input port connected to a second branch 122 of the rib-type asymmetric directional coupler 120. The gap 133 may have an increasing width between the two output waveguides, and may be configured to suppress optical coupling between the two output waveguides.

In some embodiments, the apparatus may further include a silicon-on-insulator (SOI) substrate that supports the input waveguide section 100, the polarization rotator section 110, the polarization splitter section 120, and the outgoing waveguide section 130.

In some embodiments, the SOI substrate may have a top-silicon layer with a thickness of 220±20 nm.

In some embodiments, the input waveguide section 100 may include a rib-type waveguide.

In some embodiments, the higher-order mode may be TE1 mode.

In some embodiments, a width profile of the tapered slab 115 of the first part of the tapered-slab rib-type waveguide 111 may have a linearly tapered profile, an exponentially tapered profile, a quadratically tapered profile, or a combination of some or all of above-listed tapered profiles.

In some embodiments, a width profile of the tapered rib 113 of the second part of the tapered-rib rib-type waveguide 112 may have a linearly tapered profile, an exponentially tapered profile, a quadratically tapered profile, or a combination of some or all of above-listed tapered profiles.

In some embodiments, an efficiency of polarization conversion from a TM0 mode to the TEn mode may be configured to be higher near a center of the second part of the taper rib-type waveguide 113, and may also be configured to be lower near an end of the second part of the taper rib-type waveguide such that a tapered-rib configuration of the taper rib-type waveguide is more tolerant to a fabrication process.

In some embodiments, the first branch 121 of the asymmetric directional coupler 120 may be a straight rib type waveguide.

In some embodiments, the first branch 121 of the asymmetric directional coupler 120 may include a tapered-rib type waveguide with an increasing width or a tapered-rib type waveguide with a decreasing width.

In some embodiments, the rib of the second branch 122 of the asymmetric directional coupler 120 may be a tapered rib with a width profile having a linearly tapered profile, an exponentially tapered profile, a quadratically tapered profile, or a combination of some or all of above-listed tapered profiles.

In some embodiments, an efficiency of adiabatically coupling from the TEn mode in the first branch to the TE0 mode in the second branch 122 may be configured to be higher near a center of the rib-type asymmetric directional coupler 120, and may also be configured to be lower near an end of the rib-type asymmetric directional coupler 120 such that a tapered-rib configuration of the rib-type asymmetric directional coupler 120 is more tolerant to a fabrication process.

In some embodiments, the slab of the first output waveguide 131 may be configured to be taper-like to gradually couple the TE0-polarized rib-mode signal to TE0-polarized channel-mode.

In some embodiments, the slab of the second output waveguide 132 may be configured to be taper-like to gradually couple a TE0-polarized rib-mode signal to a TE0-polarized channel-mode.

In some embodiments, the outgoing waveguide section 130 may also include a TM-mode filter and a TE1 mode filter.

In some embodiments, the TM-mode filter may include a series of bending-waveguide with a small radius of several microns.

In some embodiments, the TE1 mode filter may include a channel waveguide or a rib-type waveguide with a predetermined waveguide width configured to support TE0-mode and TM0-mode propagation.

Figure 7:
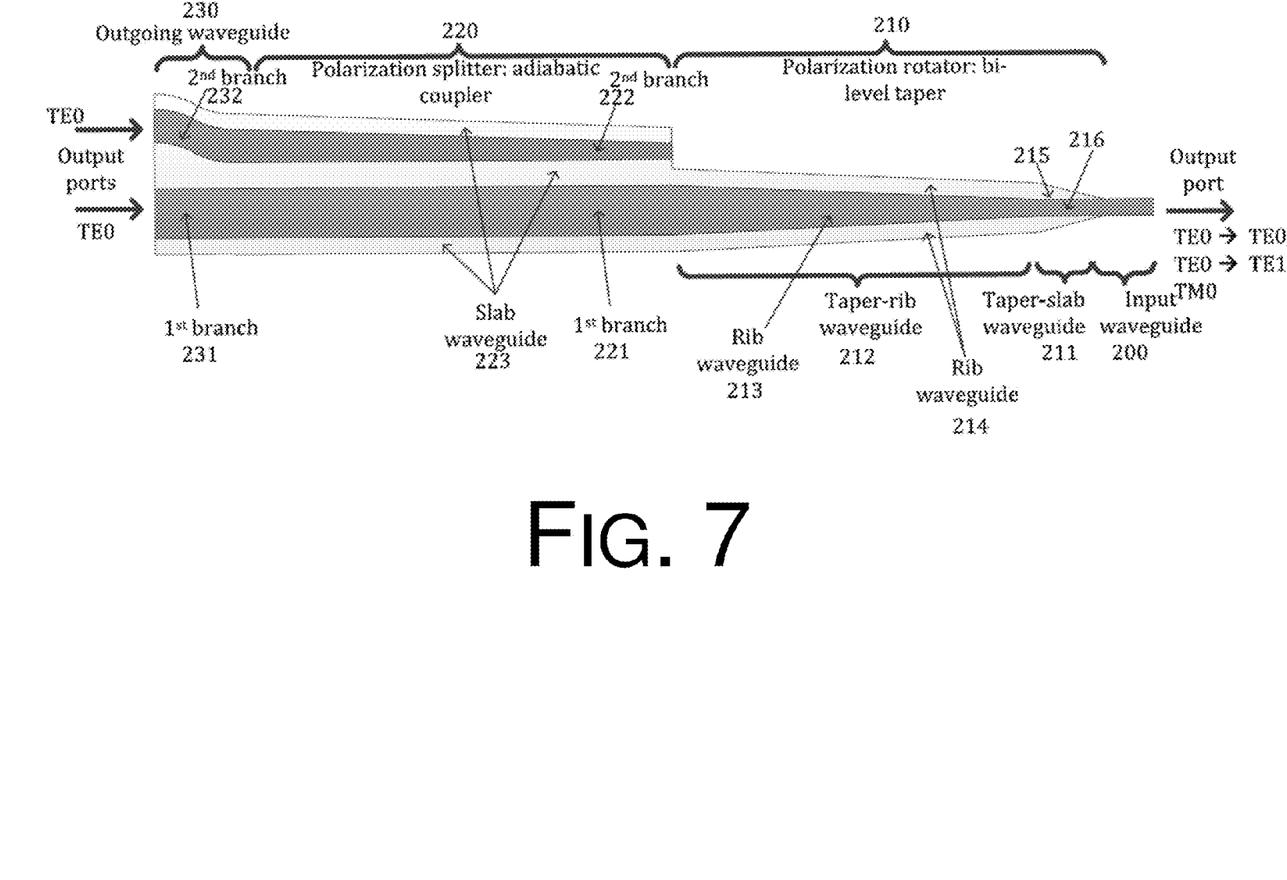
FIG. 7 shows a top view of a polarization rotator-combiner based on slab-type waveguides in accordance with another embodiment of the present disclosure.

In another aspect, an integrated polarization rotator-combiner apparatus may include an input waveguide section 230, a rib-type waveguide based polarization combiner section 220, a rib-type waveguide based polarization rotator section 210, and an outgoing waveguide section 200.

In some embodiments, the input waveguide section 230 may include two input waveguides separated by a decreasing-width gap. The two input waveguides may include a first input waveguide 231 and a second input waveguide 232. The first input waveguide 231 may include an output port connected to a first branch 221 of a rib-type asymmetric directional coupler 220. The second input waveguide 232 may include an output port connected to a second branch 222 of the rib-type asymmetric directional coupler 220. The input waveguide section 230 may also include a gap with a decreasing width between the two input waveguides. The gap may be configured to gradually increasing coupling between the two waveguides 231, 232 as a gradual transition from separated waveguide modes in the input waveguide section 230 to the coupled modes in the rib-type asymmetric directional coupler 220.

In some embodiments, the polarization combiner 220 section may include a rib-type asymmetric directional coupler 220 which may include a first branch 221 and a second branch 222. The first branch 221 may be connected to an output port of a first branch 231 of the input waveguide section 230. The first branch 221 may be configured to propagate a TE0 component to the output port without loss. The second branch 222 may be disposed in parallel with the first branch 221. A rib width of the second branch 222 may be configured to match a TE0 mode thereof to the a higher-order mode, TEn, in the second branch 222 such that a TE0 component from the second branch 222 is coupled to the TEn component in the first branch 221 of the polarization combiner section 220.

In some embodiments, the polarization rotator 210 section may include a taper rib-type waveguide which may include a first part 211 and a second part 212. The first part 212 may include a tapered rib 216 with smaller width on an output side. The tapered rib may be configured to rotate a TEn-polarized component of an optical signal to a higher-order mode, TM0, of the rib-type waveguide and to output a TM0 mode to the outgoing waveguide section. The number n may be greater than or equal to 1. The TE0-polarized component may propagate without loss and may be provided to the outgoing waveguide section. The second part 211 may include a tapered slab 215 on each side of the rib-type waveguide. Each tapered slab may be configured to adiabatically couple the optical signal from rib modes to channel modes.

In some embodiments, the output waveguide section 200 may be connected to an output of polarization rotator section 210, and may include a channel-type waveguide configured to output an optical signal with TE0-polarized and TM0-polarized modes.

In some embodiments, the apparatus may also include a silicon-on-insulator (SOI) substrate that supports the input waveguide section, the polarization rotator section, the polarization splitter section, and the outgoing waveguide section.

In some embodiments, the SOI substrate may include a top-silicon layer with a thickness of 220±20 nm.

In some embodiments, the output waveguide section 200 may include a rib-type waveguide.

In some embodiments, the higher-order mode may be a TE1 mode.

In some embodiments, a width profile of the tapered rib 213 of the first part of the tapered-rib rib-type waveguide 212 may have a linearly tapered profile, an exponentially tapered profile, a quadratically tapered profile, or a combination of some or all of above-listed tapered profiles.

In some embodiments, a width profile of the tapered slab 215 of the second part of the tapered-slab rib-type waveguide 211 may have a linearly tapered profile, an exponentially tapered profile, a quadratically tapered profile, or a combination of some or all of above-listed tapered profiles.

In some embodiments, an efficiency of polarization conversion from a TM0 mode to the TEn mode may be configured to be higher near a center of the second part of the taper rib-type waveguide 212, and configured to be lower near an end of the second part of the taper rib-type waveguide such that a tapered-rib configuration of the taper rib-type waveguide is more tolerant to a fabrication process.

In some embodiments, the first branch 221 of the asymmetric directional coupler 220 may include a straight rib type waveguide.

In some embodiments, the first branch 221 of the asymmetric directional coupler 220 may include a tapered-rib type waveguide with an increasing width or a tapered-rib type waveguide with a decreasing width.

In some embodiments, a rib of the second branch 222 may be a tapered rib with a width profile having a linearly tapered profile, an exponentially tapered profile, a quadratically tapered profile, or a combination of some or all of above-listed tapered profiles.

In some embodiments, an efficiency of adiabatically coupling from the TEn mode in the first branch to the TE0 mode in the second branch 222 may be configured to be higher near a center of the rib-type asymmetric directional coupler, and configured to be lower near an end of the rib-type asymmetric directional coupler 220 such that a tapered-rib configuration of the rib-type asymmetric directional coupler is more tolerant to a fabrication process.

In some embodiments, a slab of the output waveguide 200 may be configured to be taper-like to gradually couple a TE0-polarized channel-mode signal to a TE0-polarized rib-mode.

In another aspect, a second integrated polarization rotator/splitter apparatus may be the integrated polarization rotator/splitter apparatus described above implemented in a reverse direction, functioning to be a polarization rotator/combiner as illustrated in FIG. 7. That, the output ports of the apparatus described above may be utilized as input ports for the second integrated polarization rotator/combiner apparatus, which are inputted with two TE0-polarized optical signals, while the input port of the apparatus described above may be utilized as the output port for the integrated polarization rotator/splitter apparatus, which outputs an optical signal of both TE0 and TM0 components.

In one aspect, a method of fabrication of an integrated polarization rotator/splitter apparatus may include: forming a SOI waveguide for the apparatus; performing a lithography and a dry-etch process to form a rib pattern for the apparatus; performing a lithography and a dry-etch process to form a slab pattern for the apparatus; and performing a film deposition process to form a cladding layer for the apparatus. The apparatus may include an input waveguide section, a polarization rotator section, a polarization splitter section, and an outgoing waveguide section. The input waveguide section may include a channel-type waveguide configured to receive an optical signal with TE0-polarized and TM0-polarized modes. The polarization rotator section may include a taper rib-type waveguide that includes a first part and a second part. The first part may include a tapered slab on each side of the rib-type waveguide. Each tapered slab may be configured to adiabatically couple an optical signal from channel modes to rib modes. The second part may include a tapered rib with larger width on an output side. Each tapered rib may be configured to rotate a TM0-polarized component of the optical signal to a higher-order mode, TEn, of the rib-type waveguide and to output the TEn mode to the polarization splitter section, with n greater than or equal to 1. The TE0-polarized component may propagate without loss and is provided to the polarization splitter section. The polarization splitter section may include a rib-type asymmetric directional coupler that includes a first branch and a second branch. The first branch may be connected to an output port of the polarization rotator section. The first branch may be configured to propagate the TE0-polarized component to the output port without loss. The second branch may be disposed in parallel with the first branch. A rib width of the second branch may be configured to match a TE0 mode thereof to the higher-order mode, TEn, in the first branch such that a TEn component from the first branch is coupled to the second branch. The outgoing waveguide section may include two output waveguides separated by increasing-width gap that includes a first output waveguide, a second output waveguide and a gap. The first output waveguide may include an input port connected to a first branch of a rib-type asymmetric directional coupler. The second output waveguide may include an input port connected to a second branch of the rib-type asymmetric directional coupler. The gap may have an increasing width between the two output waveguides, the gap configured to suppress optical coupling between the two output waveguides. The SOI waveguide may include a SOI substrate that supports the input waveguide section, the polarization rotator section, the polarization splitter section, and the outgoing waveguide section.

Additional Notes

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. An integrated polarization rotator-splitter apparatus, comprising:
    an input waveguide section;
    a rib-type waveguide based polarization rotator section;
    a rib-type waveguide based polarization splitter section different from and adjacent to the rib-type waveguide based polarization rotator section; and
    an outgoing waveguide section,
    wherein the polarization rotator section comprises a taper rib-type waveguide comprising:
        a first part comprising a tapered slab on each side of the rib-type waveguide, each tapered slab configured to adiabatically couple an optical signal from channel modes to rib modes; and
        a second part comprising a tapered rib with larger width on an output side, each tapered rib configured to rotate a TM0-polarized component of the optical signal to a higher-order mode, TEn, of the rib-type waveguide and to output the TEn mode to the polarization splitter section, wherein n is greater than or equal to 1, and wherein the TE0-polarized component propagates without loss and is provided to the polarization splitter section.

2. The apparatus of claim 1, wherein the input waveguide section comprises a channel-type waveguide configured to receive an optical signal with TE0-polarized and TM0-polarized modes.

3. The apparatus of claim 1, wherein the polarization splitter section comprises a rib-type asymmetric directional coupler comprising:
    a first branch connected to an output port of the polarization rotator section, the first branch configured to propagate a TE0 component to the output port without loss; and
    a second branch disposed in parallel with the first branch, a rib width of the second branch configured to match a TE0 mode thereof to a higher-order mode, TEn, in the first branch such that a TEn component from the first branch is coupled to the second branch.

4. The apparatus of claim 1, wherein the outgoing waveguide section comprises two output waveguides separated by an increasing-width gap comprising:
    a first output waveguide comprising an input port connected to a first branch of a rib-type asymmetric directional coupler;
    a second output waveguide comprising an input port connected to a second branch of the rib-type asymmetric directional coupler; and
    a gap with an increasing width between the two output waveguides, the gap configured to suppress optical coupling between the two output waveguides.

5. The apparatus of claim 1, further comprising:
    a silicon-on-insulator (SOI) substrate that supports the input waveguide section, the polarization rotator section, the polarization splitter section, and the outgoing waveguide section.

6. The apparatus of claim 5, wherein the SOI substrate has a top-silicon layer with a thickness of 220±20 nm.

7. The apparatus of claim 2, wherein the input waveguide section comprises a rib-type waveguide.

8. The apparatus of claim 1, wherein the higher-order mode is TE1 mode.

9. The apparatus of claim 1, wherein a width profile of the tapered slab of the first part of the tapered-slab rib-type waveguide has a linearly tapered profile, an exponentially tapered profile, a quadratically tapered profile, or a combination of some or all of above-listed tapered profiles.

10. The apparatus of claim 1, wherein a width profile of the tapered rib of the second part of the tapered-rib rib-type waveguide has a linearly tapered profile, an exponentially tapered profile, a quadratically tapered profile, or a combination of some or all of above-listed tapered profiles.

11. The apparatus of claim 10, wherein an efficiency of polarization conversion from a TM0 mode to the TEn mode is configured to be higher near a center of the second part of the taper rib-type waveguide, and configured to be lower near an end of the second part of the taper rib-type waveguide such that a tapered-rib configuration of the taper rib-type waveguide is more tolerant to a fabrication process.

12. The apparatus of claim 3, wherein the first branch of the asymmetric directional coupler is a straight rib type waveguide.

13. The apparatus of claim 3, wherein the first branch of the asymmetric directional coupler comprises a tapered-rib type waveguide with an increasing width or a tapered-rib type waveguide with a decreasing width.

14. The apparatus of claim 3, wherein the rib of the second branch is a tapered rib with a width profile having a linearly tapered profile, an exponentially tapered profile, a quadratically tapered profile, or a combination of some or all of above-listed tapered profiles.

15. The apparatus of claim 14, wherein an efficiency of adiabatically coupling from the TEn mode in the first branch to the TE0 mode in the second branch is configured to be higher near a center of the rib-type asymmetric directional coupler, and configured to be lower near an end of the rib-type asymmetric directional coupler such that a tapered-rib configuration of the rib-type asymmetric directional coupler is more tolerant to a fabrication process.

16. The apparatus of claim 4, wherein the first output waveguide comprises a rib-waveguide to channel-waveguide transition structure, the slab of which configured to be taper-like with decreasing width to gradually couple the TE0-polarized rib-mode signal to TE0-polarized channel-mode.

17. The apparatus of claim 4, wherein the slab of the second output waveguide is configured to be taper-like to gradually couple a TE0-polarized rib-mode signal to a TE0-polarized channel-mode.

18. The apparatus of claim 4, wherein the outgoing waveguide section further comprises a TM-mode filter and a TE1 mode filter.

19. The apparatus of claim 18, wherein the TM-mode filter comprises a series of bending-waveguide with a small radius of several microns.

20. The apparatus of claim 18, wherein the TE1 mode filter comprises a channel waveguide or a rib-type waveguide with a predetermined waveguide width configured to support TE0-mode and TM0-mode propagation.

21. An integrated polarization rotator-combiner apparatus, comprising:
an input waveguide section;
a rib-type waveguide based polarization combiner section;
a rib-type waveguide based polarization rotator section different from and adjacent to the rib-type waveguide based polarization combiner section; and
an outgoing waveguide section,
wherein the polarization rotator section comprises a taper rib-type waveguide comprising:
a first part comprising a tapered rib with smaller width on an output side, the tapered rib configured to rotate a TEn-polarized component of an optical signal to a higher-order mode, TM0, of the rib-type waveguide and to output a TM0 mode to the outgoing waveguide section, wherein n is greater than or equal to 1, and wherein the TE0-polarized component propagates-without loss and is provided to the outgoing waveguide section; and
a second part comprising a tapered slab on each side of the rib-type waveguide, each tapered slab configured to adiabatically couple the optical signal from rib modes to channel modes.

22. The apparatus of claim 21, wherein the input waveguide section comprises two input waveguides separated by a decreasing-width gap, the two input waveguides comprising:
a first input waveguide comprising an output port connected to a first branch of a rib-type asymmetric directional coupler;
a second input waveguide comprising an output port connected to a second branch of the rib-type asymmetric directional coupler; and
a gap with a decreasing width between the two input waveguides, the gap configured to gradually increasing coupling between the two waveguides as a gradual transition from separated waveguide modes in the input waveguide section to the coupled modes in the rib-type asymmetric directional coupler.

23. The apparatus of claim 21, wherein the polarization combiner section comprises a rib-type asymmetric directional coupler comprising:
a first branch connected to an output port of a first branch of the outgoing waveguide section, the first branch configured to propagate a TE0 component to the output port without loss; and
a second branch disposed in parallel with the first branch, a rib width of the second branch configured to match a TE0 mode thereof to the a higher-order mode, TEn, in the second branch such that a TE0 component from the second branch is coupled to the TEn component in the first branch of the polarization combiner section.

24. The apparatus of claim 21, wherein the output waveguide section, connected to an output of polarization rotator section, comprises a channel-type waveguide configured to output an optical signal with TE0-polarized and TM0-polarized modes.

25. The apparatus of claim 21, further comprising:
a silicon-on-insulator (SOI) substrate that supports the input waveguide section, the polarization rotator section, the polarization splitter section, and the outgoing waveguide section.

26. The apparatus of claim 25, wherein the SOI substrate has a top-silicon layer with a thickness of 220±20 nm.

27. The apparatus of claim 24, wherein the output waveguide section comprises a rib-type waveguide.

28. The apparatus of claim 23, wherein the higher-order mode is a TE1 mode.

29. The apparatus of claim 21, wherein a width profile of the tapered rib of the first part of the tapered-rib rib-type waveguide has a linearly tapered profile, an exponentially tapered profile, a quadratically tapered profile, or a combination of some or all of above-listed tapered profiles.

30. The apparatus of claim 21, wherein a width profile of the tapered slab of the second part of the tapered-slab rib-type waveguide has a linearly tapered profile, an exponentially tapered profile, a quadratically tapered profile, or a combination of some or all of above-listed tapered profiles.

31. The apparatus of claim 30, wherein an efficiency of polarization conversion from a TM0 mode to the TEn mode is configured to be higher near a center of the second part of the taper rib-type waveguide, and configured to be lower near an end of the second part of the taper rib-type waveguide such that a tapered-rib configuration of the taper rib-type waveguide is more tolerant to a fabrication process.

32. The apparatus of claim 23, wherein the first branch of the asymmetric directional coupler comprises a straight rib type waveguide.

33. The apparatus of claim 23, wherein the first branch of the asymmetric directional coupler comprises a tapered-rib type waveguide with an increasing width or a tapered-rib type waveguide with a decreasing width.

34. The apparatus of claim 23, wherein a rib of the second branch is a tapered rib with a width profile having a linearly tapered profile, an exponentially tapered profile, a quadratically tapered profile, or a combination of some or all of above-listed tapered profiles.

35. The apparatus of claim 34, wherein an efficiency of adiabatically coupling from the TEn mode in the first branch to the TE0 mode in the second branch is configured to be higher near a center of the rib-type asymmetric directional coupler, and configured to be lower near an end of the rib-type asymmetric directional coupler such that a tapered-rib configuration of the rib-type asymmetric directional coupler is more tolerant to a fabrication process.

36. The apparatus of claim 22, wherein a slab of the output waveguide is configured to be taper-like to gradually couple a TE0-polarized channel-mode signal to a TE0-polarized rib-mode.

37. A method of fabrication of an integrated polarization rotator-splitter/combiner apparatus, comprising:
    forming a silicon-on-insulator (SOI) waveguide for the apparatus;
    performing a lithography and a dry-etch process to form a rib pattern for the apparatus;
    performing a lithography and a dry-etch process to form a slab pattern for the apparatus; and
    performing a film deposition process to form a cladding layer for the apparatus,
    wherein the apparatus also is configured to be reversely connected as a polarization rotator-combiner, comprising:
        an input waveguide section;
        a polarization rotator section;
        a polarization splitter section; and
        an outgoing waveguide section,
    wherein the input waveguide section comprises a channel-type waveguide configured to receive an optical signal with TE0-polarized and TM0-polarized modes,
    wherein the polarization rotator section comprises a taper rib-type waveguide comprising:
        a first part comprising a tapered slab on each side of the rib-type waveguide, each tapered slab configured to adiabatically couple an optical signal from channel modes to rib modes; and
        a second part comprising a tapered rib with larger width on an output side, each tapered rib configured to rotate a TM0-polarized component of the optical signal to a higher-order mode, TEn, of the rib-type waveguide and to output the TEn mode to the polarization splitter section, wherein n is greater than or equal to 1, and wherein the TE0-polarized component propagates-without loss and is provided to the polarization splitter section,
    wherein the polarization splitter section comprises a rib-type asymmetric directional coupler comprising:
        a first branch connected to an output port of the polarization rotator section, the first branch configured to propagate the TE0-polarized component to the output port-without loss; and
        a second branch disposed in parallel with the first branch, a rib width of the second branch configured to match a TE0 mode thereof to the higher-order mode, TEn, in the first branch such that a TEn component from the first branch is coupled to the second branch,
    wherein the outgoing waveguide section comprises two output waveguides separated by increasing-width gap comprising:
        a first output waveguide comprising an input port connected to a first branch of a rib-type asymmetric directional coupler;
        a second output waveguide comprising an input port connected to a second branch of the rib-type asymmetric directional coupler; and
        a gap with increasing width between the two output waveguides, the gap configured to suppress optical coupling between the two output waveguides, and
    wherein the SOI waveguide comprises a SOI substrate that supports the input waveguide section, the polarization rotator section, the polarization splitter section, and the outgoing waveguide section.

* * * * *